US012724421B2

(12) United States Patent
Scaglione et al.

(10) Patent No.: US 12,724,421 B2
(45) Date of Patent: Sep. 1, 2026

(54) FACILITY NAVIGATION LOCALIZATION FOR MOBILE AUTONOMOUS ROBOT

(71) Applicant: INTERNATIONAL BUSINESS MACHINES CORPORATION, Armonk, NY (US)

(72) Inventors: Joseph Scaglione, Poughkeepsie, NY (US); William J. Green, Cary, NC (US); Karl Owen Casserly, Valley Stream, NY (US); Mateusz Koziol, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 18/615,022

(22) Filed: Mar. 25, 2024

(65) Prior Publication Data

US 2025/0298412 A1 Sep. 25, 2025

(51) Int. Cl.

*G05D 1/244* (2024.01)
*G05D 1/246* (2024.01)
*G05D 107/70* (2024.01)
*G05D 111/10* (2024.01)
*G05D 111/30* (2024.01)

(52) U.S. Cl.

CPC ............. *G05D 1/244* (2024.01); *G05D 1/246* (2024.01); *G05D 2107/70* (2024.01); *G05D 2111/10* (2024.01); *G05D 2111/32* (2024.01)

(58) Field of Classification Search

CPC .... G05D 1/244; G05D 1/246; G05D 2107/70; G05D 2111/10; G05D 2111/32

See application file for complete search history.

(56) References Cited

U.S. PATENT DOCUMENTS 5,525,883 A 6/1996 Avitzour
7,725,232 B2 5/2010 Mäkelä et al.
8,845,229 B2 9/2014 Groeneweg
10,059,006 B2 8/2018 Rublee
10,245,993 B1 4/2019 Brady
10,976,746 B2 * 4/2021 Hendricks ............ G05D 1/0234
11,290,977 B1 3/2022 Chinnapalli
11,326,887 B2 * 5/2022 Holz ....................... G01S 5/163
(Continued)

FOREIGN PATENT DOCUMENTS

CN 105115498 B 1/2019
CN 104515531 B 8/2019
(Continued)

OTHER PUBLICATIONS

A beacon based localization system for autonomous mobile robots (Year: 2008).*

(Continued)

*Primary Examiner* — Kyle T Johnson
(74) *Attorney, Agent, or Firm* — Michael A. Petrocelli

(57) ABSTRACT

Facilitating navigation localization for a mobile robot operating autonomously can include a deployment of a retractable landmark in a work area in response to an operational threshold not being met for a mobile robot to autonomously operate traversing the work area. The operational threshold not being met can be based on a determination of when landmarks in the work area for the mobile robot to use as perimeter markers do not meet the operational threshold.

20 Claims, 7 Drawing Sheets

(56) References Cited

U.S. PATENT DOCUMENTS

| | | | | |
|---|---|---|---|---|
| 11,720,117 | B1 | 8/2023 | Kim | |
| 2007/0276558 | A1 | 11/2007 | Kim | |
| 2011/0153338 | A1 * | 6/2011 | Anderson | G01S 5/0009 705/1.1 |
| 2016/0321921 | A1 * | 11/2016 | Stafford | B60Q 7/00 |
| 2018/0016758 | A1 * | 1/2018 | Dolinar | G05D 1/248 |
| 2018/0307241 | A1 * | 10/2018 | Holz | G05D 1/0244 |
| 2020/0089248 | A1 * | 3/2020 | Coq | G05D 1/0236 |
| 2020/0319640 | A1 * | 10/2020 | Vogel | G05D 1/0291 |
| 2022/0253059 | A1 | 8/2022 | Pandey et al. | |
| 2022/0322602 | A1 * | 10/2022 | Mårtensson | H04W 72/542 |
| 2022/0410898 | A1 * | 12/2022 | Nett | B60W 60/0025 |
| 2023/0224658 | A1 | 7/2023 | Norris | |
| 2023/0236604 | A1 * | 7/2023 | Frick | G05D 1/2297 701/23 |
| 2023/0256959 | A1 * | 8/2023 | Chiba | G05D 1/0246 340/932.2 |
| 2023/0292657 | A1 * | 9/2023 | Xu | G05D 1/2297 |
| 2024/0069560 | A1 * | 2/2024 | Morse | G05D 1/43 |
| 2024/0111308 | A1 * | 4/2024 | Shokri | B65G 1/0492 |
| 2024/0179161 | A1 * | 5/2024 | Horan | G06N 3/08 |
| 2025/0298412 | A1 * | 9/2025 | Scaglione | G05D 1/244 |

FOREIGN PATENT DOCUMENTS

| | | | | | |
|---|---|---|---|---|---|
| EP | 3590016 | A1 | | 1/2020 | |
| JP | 2011128158 | A | * | 6/2011 | G01S 5/0009 |
| JP | 6267858 | B2 | | 1/2018 | |
| KR | 100608932 | B1 | | 8/2006 | |
| KR | 101146608 | B1 | | 5/2012 | |
| KR | 101246249 | B1 | | 3/2013 | |
| KR | 20190036433 | A | | 4/2019 | |
| KR | 10-2019-0121275 | A | | 10/2019 | |
| KR | 20200034574 | A | | 3/2020 | |
| KR | 102509567 | B1 | | 3/2023 | |
| WO | WO-2016103562 | A1 | * | 6/2016 | G05D 1/2446 |
| WO | WO-2024043831 | A1 | * | 2/2024 | G01C 21/206 |

OTHER PUBLICATIONS

Collaborative architecture design for automated deployment and positioning of beaconing robots (Year: 2013).*

A minimalist Self Localization Approach for swarm robots based on active beacon in indoor environments (Year: 2023).*

WO-2016103562-A1 translation (Year: 2016).*

JP-2011128158-A translation (Year: 2011).*

Scaglione et al., "Augmented LIDAR (Light Detection and Ranging) Boundaries for Autonomous Mobile Robot Routing", U.S. Appl. No. 18/944,367, filed Nov. 12, 2024, 51 Pages. (Spec + Drawing).

Betke et al., "Mobile Robot Localization Using Landmarks", IEEE Transactions On Robotics and Automation, vol. 13, No. 2, Apr. 1997, pp. 251-263.

Disclosed Anonymously, "Device Analytics for Autonomous Mobile Robots With Automatic Data Capture and/or Printing", An IP.com Prior Art Database Technical Disclosure, IP.com No. IPCOM000273305D, IP.com Electronic Publication Date: Nov. 28, 2023, 5 pages.

Disclosed Anonymously, "System and Method for Augmented Reality Model-Driven Control of Robots for Remote and Autonomous Data Center Services", an IP.com Prior Art Database Technical Disclosure, IP.com No. IPCOM000271100D, IP.com Electronic Publication Date: Oct. 18, 2022, 5 pages.

Kim et al., "Localization of Mobile Robot Based on Fusion of Artificial Landmark and RF TDOA Distance Under Indoor Sensor Network", Intech Open Access Publisher, Int J Adv Robotic Sy, 2011, vol. 8, No. 4, pp. 203-211.

Senarathne, "Method and Apparatus for Autonomous Navigation of Mobility Devices", An IP.com Prior Art Database Technical Disclosure, IP.com No. IPCOM000261300D, IP.com Electronic Publication Date: Feb. 19, 2020, 28 pages.

Thrun, "Bayesian Landmark Learning for Mobile Robot Localization", to appear in Machine Learning, Received Jun. 13, 1996; Revised Apr. 4, 1997, 35 pages.

Bantounos, et al., Towards a Solid-State Light Detection and Ranging System Using Holographic Illumination and Time-Of-Flight Image Sensing, Special Section Paper, Mar. 4, 2022, vol. 30, Issue 5, pp. 363-372.

* cited by examiner

FACILITY NAVIGATION LOCALIZATION FOR MOBILE AUTONOMOUS ROBOT

BACKGROUND

The present disclosure relates to facilitating navigation localization for an autonomous mobile robot.

In one example, Autonomous Mobile Robots (AMRs) can match Lasar Imaging Detection and Ranging (LIDAR) data to a static point-cloud map to locate their position on a map. In highly dynamic facilities, these point-cloud maps quickly become outdated, resulting in less matching data between lidar sensors and the static map, which can ultimately cause AMR localization failures.

For example, internal movements and changes to floor usage can be common causes of outdated maps. Frequent remapping can be time-consuming and complicated. Removing excessive dynamic point-cloud data results in similar localization issues since AMR has less point-cloud data to match to. To address this, static objects are added to these dynamic areas and the point-cloud maps to provide consistent reference data to the AMR. Safety bollards, barriers, and permanent shelving are the most common objects added to aide in AMR localization. Adding static objects to these areas can limit the flexibility of workspaces and the efficiency of movements within the facility. Objects can occupy critical and valuable real estate on a workspace floor or within a warehouse.

SUMMARY

The present disclosure recognizes the shortcomings and problems associated with current techniques for facilitating navigation localization for autonomous mobile robots using LIDAR.

The present invention provides a solution for AMRs using LIDAR data where floor usage changes resulting in changes to a point-map.

In an aspect according to the present invention, a method for facility navigation localization for a mobile robot operating autonomously can include deploying, using a computer, a retractable landmark in a work area in response to an operational threshold not being met for a mobile robot to autonomously operate traversing the work area. The method can include the operational threshold not being met being based on, determining, using the computer, when landmarks in the work area for the mobile robot to use as perimeter markers to provide a perimeter for the mobile robot to autonomously operate, do not meet the operational threshold.

In a related aspect, the deployment of the retractable landmark provides another perimeter marker in addition to the landmarks in the work area used as the perimeter markers, and the operational threshold is met when the retractable landmark is deployed.

In a related aspect, the determining when the landmarks do not provide the perimeter meeting the operational threshold includes using a computer simulation.

In a related aspect, the method can further include retracting the retractable landmark to remove the retractable landmark to use as a perimeter marker.

In a related aspect, the retractable landmark is actuatable from a hidden position to a deployed position resulting in the operational threshold being met, and the hidden position results in the operational threshold not being met.

In a related aspect, the retractable landmark is actuatable from a hidden position to a deployed position as a perimeter marker, and when in the hidden position the retractable landmark is not available as a perimeter marker.

In a related aspect, the retractable landmark is actuatable from a hidden position to a deployed position as a perimeter marker, and when in the hidden position the retractable landmark is not available as a perimeter marker. Actuating the retractable landmark from the hidden position includes mechanical operation.

In related aspect, the retractable landmark is actuatable from a hidden position to a deployed position as a perimeter marker, and when in the hidden position the retractable landmark is not available as a perimeter marker. Actuating the retractable landmark from the hidden position includes mechanical operation which includes electrical or mechanical actuation in the deploying of the retractable landmark.

In a related aspect, the retractable landmark is actuatable from a hidden position to a deployed position as a perimeter marker, and when in the hidden position the retractable landmark is not available as a perimeter marker. Actuating the retractable landmark from the hidden position and retracting the retractable landmark from the deployed position includes mechanical operation which includes electrical or mechanical actuation and retraction in the deploying and retraction of the retractable landmark.

In a related aspect, the method further includes actuating, as part of the deploying, the retractable landmark from a hidden position to a deployed position as a perimeter marker. The retractable landmark in the hidden position is not available as a perimeter marker, and wherein the actuating of the retractable landmark from the hidden position includes mechanical operation. Retracting the retractable landmark from the deployed position to return to the hidden position, wherein the retracting includes mechanical operation.

In a related aspect, the method can further include actuating, as part of the deploying, the retractable landmark from a hidden position to a deployed position as a perimeter marker. The retractable landmark in the hidden position is not available as a perimeter marker, and wherein the actuating of the retractable landmark from the hidden position includes mechanical operation which includes electrical or mechanical actuation in the deploying of the retractable landmark. Retracting the retractable landmark from the deployed position to return to the hidden position, and the retracting includes mechanical operation which includes electrical or mechanical actuation in the retracting of the retractable landmark.

In a related aspect, the method can further include deploying a plurality of retractable landmarks in the work area in response to the operational threshold not being met for the mobile robot to autonomously operate traversing the work area.

In a related aspect, the method can further include determining which objects of a plurality of objects in the work areas to designate as the landmarks in the work area for the mobile robot to use as the perimeter markers to provide the perimeter for the mobile robot to operate traversing the work area.

In a related aspect, the method can further include scanning, using a device communicating with the computer, the work area for the landmarks, as part of the determining when the landmarks in the work area for the mobile robot to use as the perimeter markers provides the perimeter for the mobile robot.

In a related aspect, the method can further include receiving, at the computer, a layout of the work area for the mobile robot, as part of the determining when the landmarks in the work area do not provide the perimeter meeting the operational threshold.

In a related aspect, the operational threshold includes requirements for the perimeter markers meeting specifications for guidance of the mobile robot.

In a related aspect, the operational threshold includes requirements for perimeter markers to meet specifications for guidance used by a guidance system of the mobile robot, and the specifications of the perimeter markers meet requirements for physical attributes for being detectable by the guidance system.

In another aspect according to the present invention, a system for facility navigation localization for a mobile robot operating autonomously includes a scanning device, capable of communication with a computer, to detect landmarks in a work area for operation of a mobile robot. The computer having computer readable storage medium with embodied program instructions to determine when landmarks in the work area do not provide perimeter markers to define a perimeter meeting an operational threshold for the mobile robot to autonomously operate traversing the work area. One or more retractable landmarks are deployable in the work area, using the computer, in response to the operational threshold not being met.

In another aspect according to the present invention, a method for facility navigation localization for a mobile robot operating autonomously includes determining, using a computer, when landmarks in a work area do not provide perimeter markers to define a perimeter meeting an operational threshold for a mobile robot to autonomously operate traversing the work area. Initiating, using the computer, deployment of a retractable landmark in the work area in response to the operational threshold not being met.

In a related aspect, the method can include generating a layout plan including the retractable landmark, for facility navigation localization for the mobile robot.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
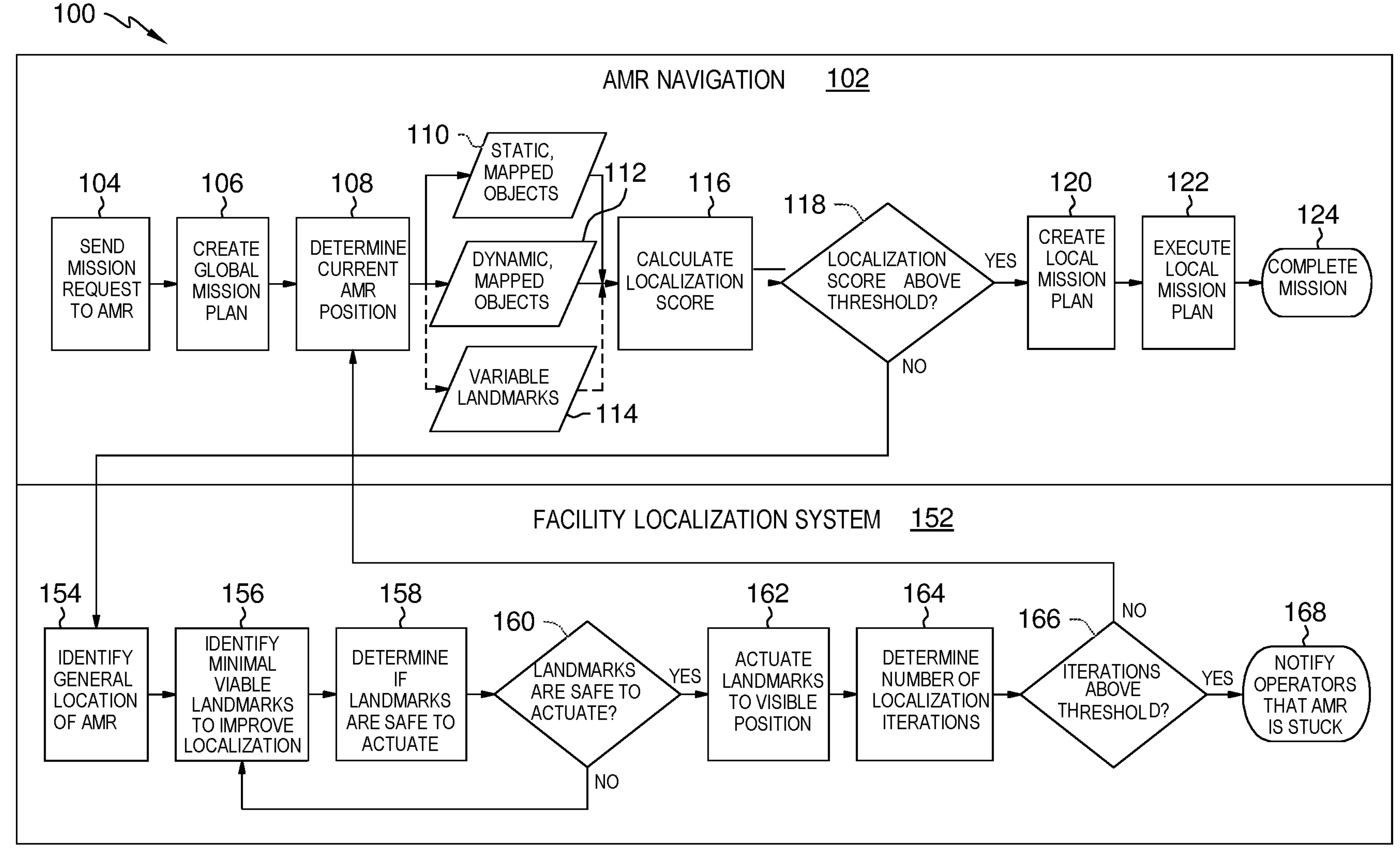
FIG. 1 is a flow chart of a process, according to an embodiment of the present disclosure, for facility navigation localization for a mobile robot.

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Embodiments and figures of the present disclosure may have the same or similar components as other embodiments. Such figures and descriptions illustrate and explain further examples and embodiments according to the present disclosure. Embodiments of the present disclosure can include operational actions and/or procedures. A method, such as a computer-implemented method, can include a series of operational blocks for implementing an embodiment according to the present disclosure which can include cooperation with one or more systems shown in the figures. The operational blocks of the methods and systems according to the present disclosure can include techniques, mechanism, modules, and the like for implementing the functions of the operations in accordance with the present disclosure. Similar components may have the same reference numerals. Components can operate in concert with a computer implemented method. It is understood that a customer can be an individual, or a group of individuals, or a company or an organization.

In one embodiment according to the present disclosure. A facility system can allow variable landmarks to appear, e.g., deploy, when an AMR has a localization score below a given threshold and to recede, e.g., retract, to a non-critical space, e.g., a hidden position, when it is not needed. For example, variable or retractable landmarks can recede below a floor, above a working space, into a wall, etc.

In one example, an AMR can calculate a current localization score and can communicate it to a variable landmark controller via a wireless communication protocol. If a localization score is below a threshold, the controller can trigger one or more variable landmarks to actuate and become visible to the AMR's scanners.

In one embodiment according to the present disclosure, variable landmarks are incorporated into the static point-cloud map in their actuated position to provide consistent reference points when needed in a workplace, such as a warehouse floor using an automated robot traversing the workplace floor. The geometry of the landmarks can be unique and specific to an area. For example, larger surface areas can have increased number of matching data points. Geometries that are rectangular or circular can be avoided, to avoid matching data with pallets, walls, or other common objects.

Landmarks can also have a unique color, reflectivity, barcode, or other physical property that would allow unique identification given the appropriate sensor (camera, reflectance sensor, barcode scanner, etc.). Once a current localization score is deemed acceptable, a variable landmark controller can trigger a landmark to recede to its non-critical space, thereby preserving flexibility of space and movements through the actuation of the landmark into the non-critical space.

Referring to FIGS. 1, according to an embodiment of the present disclosure, a system 100 is used for providing variable landmarks to be deployed as needed and recede to a non-critical space when not needed. The system includes a mobile robot, for example, an AMR (Autonomous Mobile Robot), controlled by an AMR navigation subsystem 102 and a facility localization subsystem 152. In operation, the AMR navigation 102 includes sending a mission request to an AMR, as in operation 104. The method 100 includes creating a global mission plan, as in operation 106. The method includes determining a current AMR position, as in operation 108. The method can next proceed to determining static objects, as in operation 110, dynamically mapping objects, as in operation 112, and determining variable landmarks as in operation 114. The method includes calculating a localization score, as in operation 116. The method includes determining if a localization score is above a threshold, as in operation 118. When the localization score is above the threshold, the method proceeds to create a local mission plan, as in operation 120. The method includes executing the local mission plan, as in operation 122, the method includes completing the mission plan in operation 124. When the localization score is not above the threshold at operation 118, the method proceeds to the facility localization system 152 to identify a general location of the AMR, as in operation 154. The method includes identifying minimal viable landmarks to improve localization, as in operation 156. The method includes determining if landmarks are safe to actuate, as in operation 158. Operation 160 include determining when landmarks are safe to actuate. The method includes actuating landmarks to a visible position, as in operation 162. The method includes determining a number of localization iterations, as in operation 164. Operation 166 includes determining iterations above a threshold. The method includes notifying operators that an AMR is stuck, as in operation 168.

Figure 2A:
FIG. 2A is a schematic diagram illustrating a system according to an embodiment of the present disclosure, for facility navigation localization for a mobile robot, using a deformable landmark using a pulley technique to raise and lower the landmark.
Figure 2A:
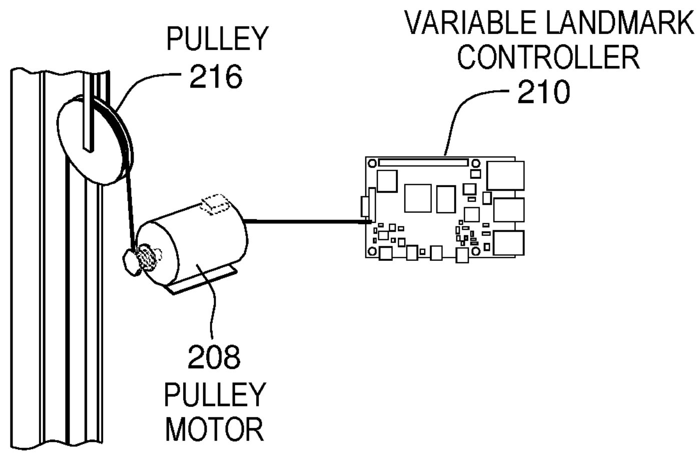
Figure 2A:
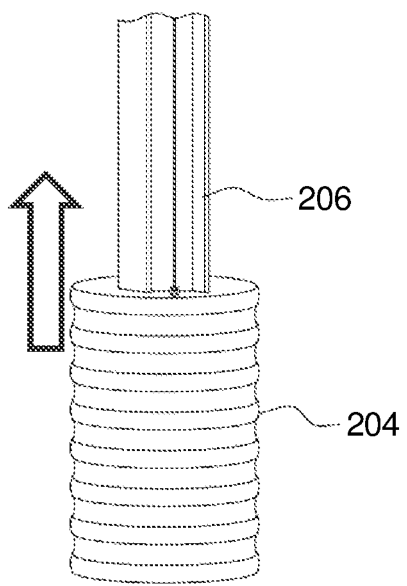
Figure 2B:
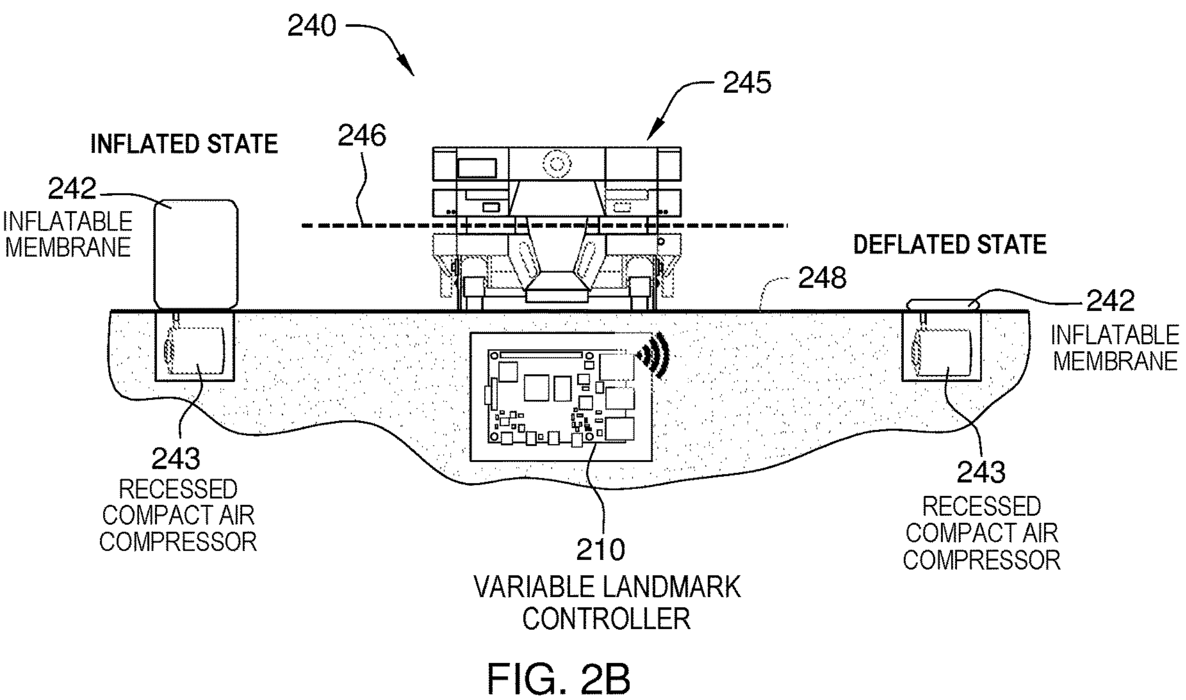
FIG. 2B is a schematic diagram illustrating a system according to an embodiment of the present disclosure, for facility navigation localization for a mobile robot, using an inflatable landmark/membrane using an air compressor and technique to raise and lower the landmark.
Figure 2C:
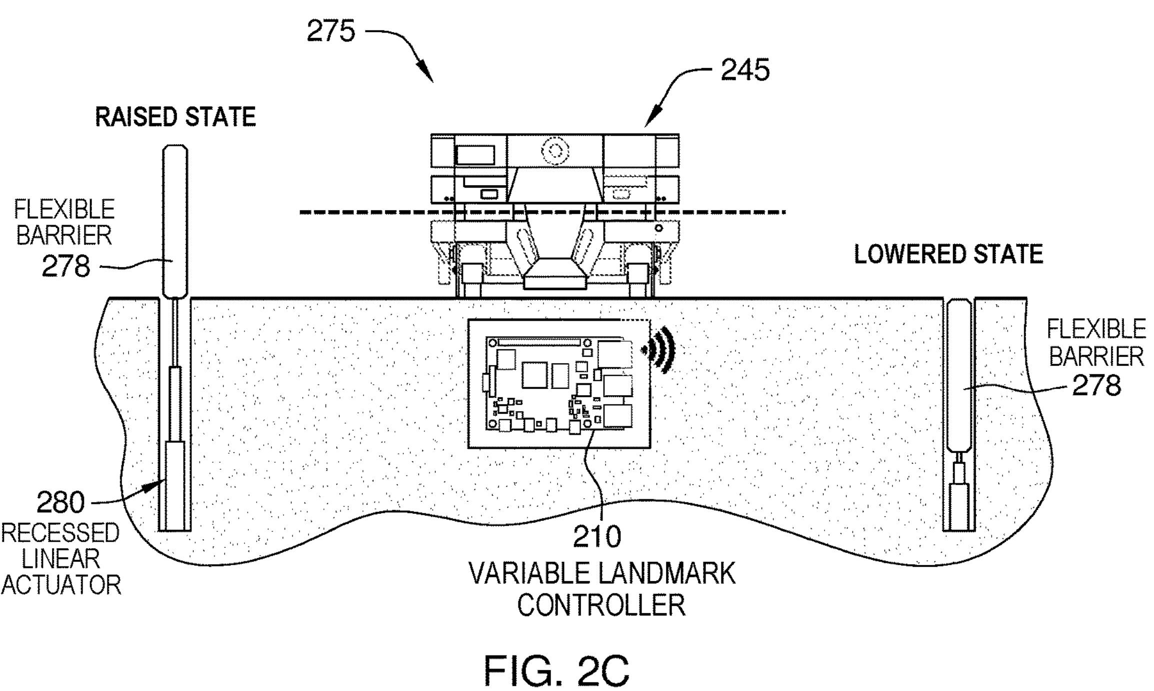
FIG. 2C is a schematic diagram illustrating a system according to an embodiment of the present disclosure, for facility navigation localization for a mobile robot, using a flexible landmark/barrier using an actuator and technique to raise and lower the landmark.

Referring to FIG. 2A, according to an embodiment of the present disclosure, a system 200 can include a landmark 204, which in this case is an impact buffer used as a retractable landmark surrounding a steel beam 206. A pulley 216 is connected to the landmark 204. The pulley is connected to a pulley motor 208 which can be controlled by a variable landmark controller 210 via an electronic connection as shown in FIG. 2A, but can also communicate via a wireless connection as shown in FIGS. 2B and 2C. When the pulley motor is engaged, the landmark 204 is moveable upwards along the steel beam 206. The system 200 is mechanical and is envisioned to require the controller 110 to actuate the pulley, or wireless communication between an autonomous mobile robot (AMR) and a facility localization system.

Referring to FIG. 2B, according to another embodiment of the present disclosure, a system 240 can include an inflatable landmark 242 or membrane in an inflated state which is connected to a recessed compact air compressor 243 in a floor 248. The inflatable landmark 242 is also shown in a deflated state. An autonomous mobile robot (AMR) 245, is an embodiment of a mobile robot, and includes communication with a variable landmark controller 210 which is used to control the AMR via a wireless signal. The AMR 245 can include one or more scanners to scan the area, such as a warehouse floor, and provide a vertical scanner zone 246. The system 240 is mechanical and is envisioned to require a controller 210 to actuate the landmark, or wireless communication between the AMR 245 and a facility localization system.

Referring to FIG. 2C, according to another embodiment of the present disclosure, a system 275 can include a flexible landmark 278 or barrier in a raised state which is connected to a recessed linear actuator 280. The flexible landmark 278 is also shown in a lowered state. An autonomous mobile robot 245 includes a variable landmark controller 210 which is used to control the AMR. The system 275 is mechanical and is envisioned to require a controller 210 to actuate the landmark, or wireless communication between the AMR 245 and a facility localization system.

Figure 3A:
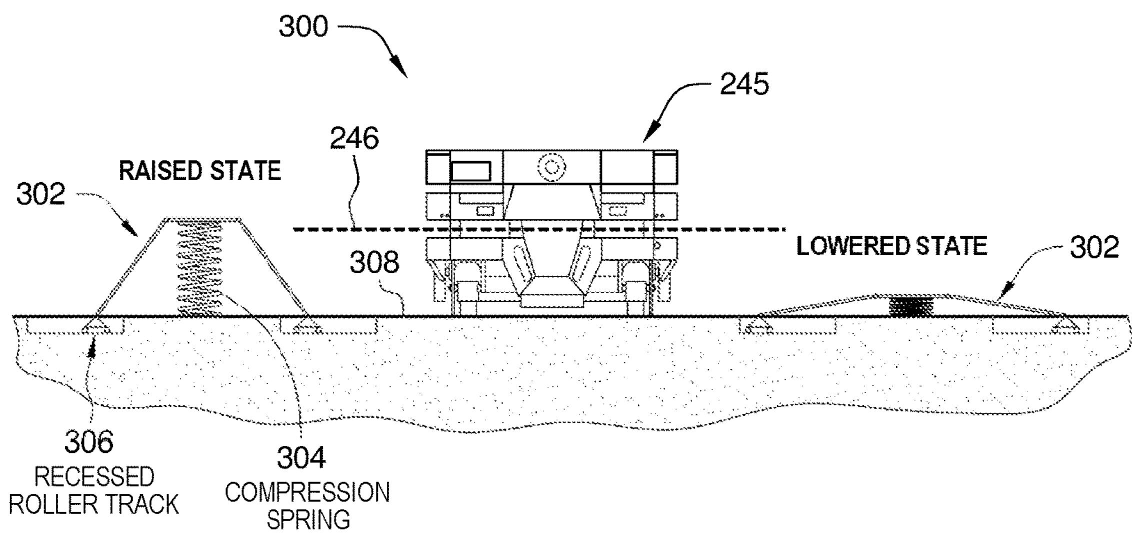
FIG. 3A is a schematic diagram illustrating a system according to an embodiment of the present disclosure, for facility navigation localization for a mobile robot, using a hinged landmark/plate using a compression spring and technique to raise and lower the landmark.

Referring to FIG. 3A, according to another embodiment of the present disclosure, a system 300 can include a hinged landmark 302 or plate in a raised state which is connected to a recessed compression spring 304 and a recessed roller track 306. The hinged landmark 302 is also shown in a lowered state. An AMR 245 is shown on a floor 308. The AMR 245 can include one or more scanners to scan the area, such as a warehouse floor, and provide the vertical scanner zone 246. The system 300 is mechanical and is not envisioned to require a controller to actuate or wireless communication between the AMR 245 and a facility localization system.

Figure 3B:
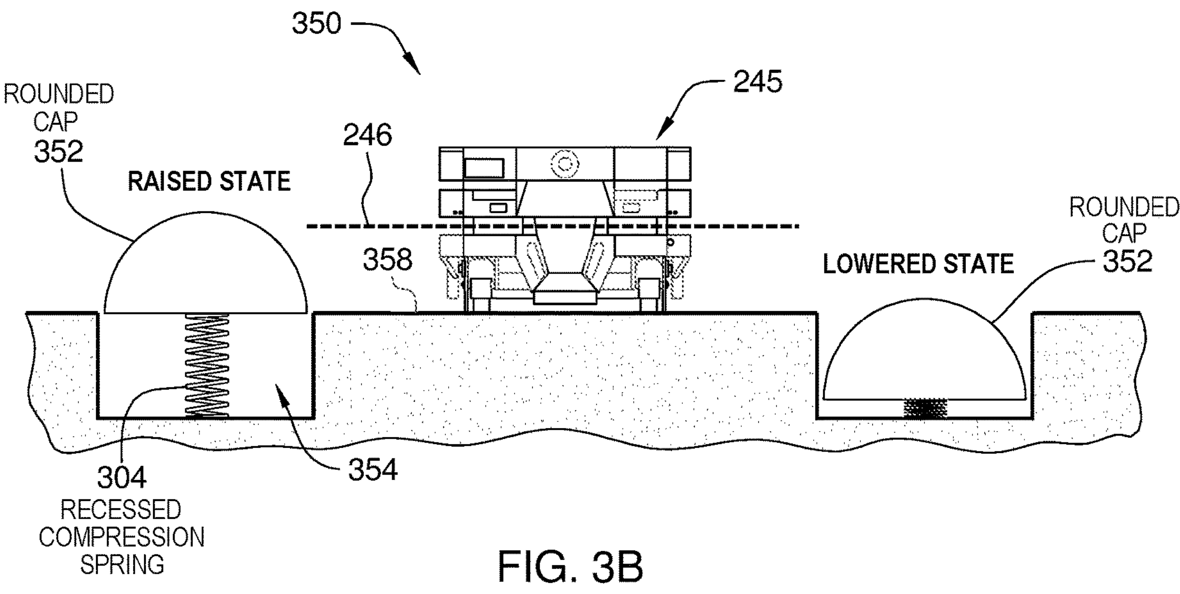
FIG. 3B is a schematic diagram illustrating a system according to an embodiment of the present disclosure, for facility navigation localization for a mobile robot, using a rounded landmark/cap using a compression spring and technique to raise and lower the landmark.

Referring to FIG. 3B, according to another embodiment of the present disclosure, a system 350 can include a rounded landmark 352 or cap in a raised state which is connected to a recessed compression spring 304 positioned in a recess 354. The rounded landmark 352 is also shown in a lowered state. AMR 245 is shown on a floor 358. The system 350 is mechanical and is not envisioned to require a controller to actuate or wireless communication between the AMR 245 and a facility localization system.

Embodiments of the present disclosure include the use of actuating landmarks for the purpose of improving a robot's navigation efforts. Embodiments described in the present disclosure preserve the flexibility and efficiency of movements within the space, such as a warehouse floor. Landmarks can include safety sensors to avoid unsafe actuation. Actuation of a landmark can be achieved through a variety of means, including but not limited to threaded rods, pulleys, linear actuators, pneumatics, hydraulics, etc.

The use of unique physical properties (geometry, color, reflectivity, etc.) for each variable landmark that, when coupled with the appropriate sensor (LIDAR (Light Detection and Ranging), camera, reflectance, etc.), allow the AMR to precisely locate itself. In one AMR design where LIDAR sensors can be used for route planning, each marker can have a unique geometry that differs significantly from the shapes of objects commonly found in a warehouse, and that is high in surface area to increase the amount of matching LIDAR data points.

In one embodiment, a control method by which a minimum number of variable landmarks are actuated to assist the AMR with localization, can consider several factors, including but not limited to the last known or approximate location and orientation of the AMR and the space needed to safely actuate the landmarks. Such a technique prevents excessive obstructions in the workspace, and can take additional factors into account such as time of day, approximate orientation to certain AMR sensors, etc. to mitigate inefficiencies.

Additional Examples and Embodiments

In one embodiment according to the present disclosure, a method for facility navigation localization (which can include boundary localization, or definition of one or more boundaries such as a perimeter, or navigation markers or landmarks) for a mobile robot (which can include in one example, an autonomous mobile robot (AMR)) operating autonomously and includes deploying, using a computer, a retractable landmark in a work area in response to an operational threshold not being met for a mobile robot to autonomously operate traversing the work area. The method includes the operational threshold not being met being based on, determining, using the computer, when landmarks in the work area for the mobile robot to use as perimeter markers to provide a perimeter for the mobile robot to autonomously operate, do not meet the operational threshold.

Figure 4:
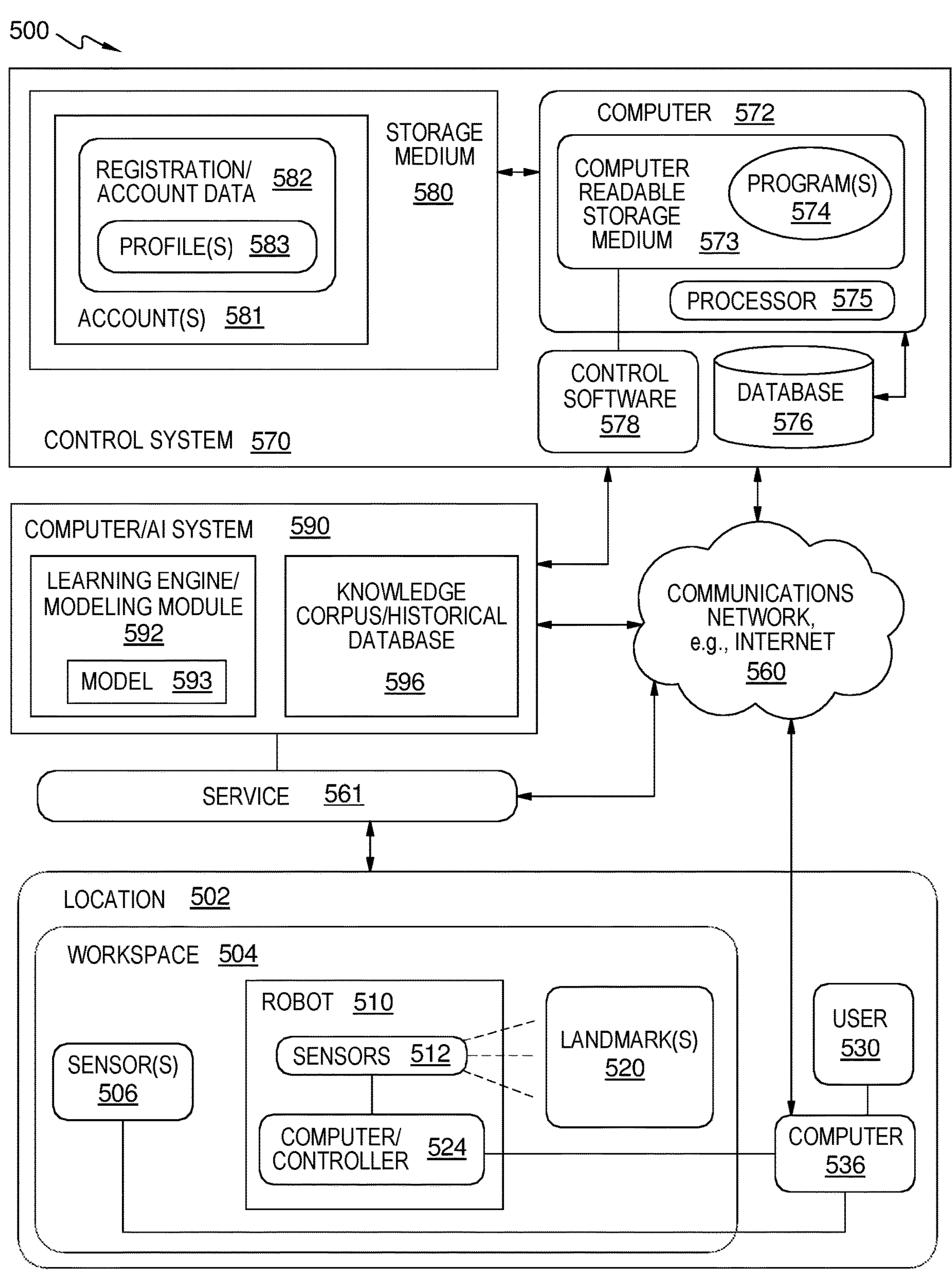
FIG. 4 is a schematic block diagram illustrating a system according to an embodiment of the present disclosure, for facility navigation localization for a mobile robot.
Figure 5:
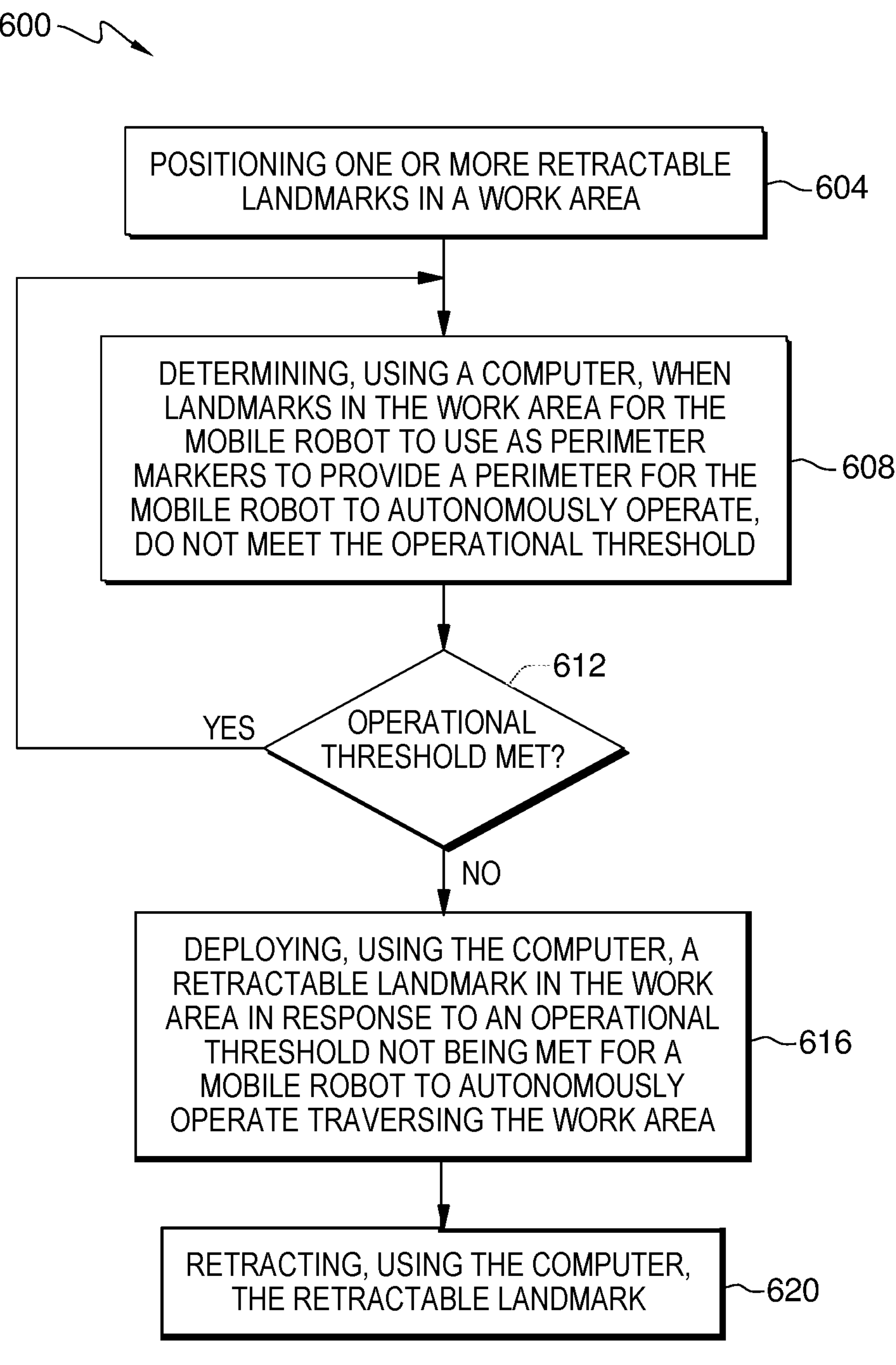
FIG. 5 is a flow chart of a method, according to an embodiment of the present disclosure, which can use the system depicted in FIG. 1, for facility navigation localization for a mobile robot.

Referring to FIGS. 4 and 5, in one embodiment according to the present disclosure, a computer implemented method 600 (shown in FIG. 5), uses a system 500 (shown in FIG. 4), to determine facility navigation localization for a mobile robot operating autonomously. The system 500 includes a control system 570 communicating with a communications network 560, which can further communicate with a computer 536 and/or a computer 524 as part of a robot 510. The robot 510 can be an autonomous mobile robot and can include one or more sensors 512 to ascertain a scanner area or zone to detect landmarks 520 in a workspace 504 at a location 502. Additional sensors 506 can be located in the workspace 504 to detect landmarks, provide positioning, or other sensor data for the robot. A user 530 can use a computer 536 to communicate with the robot 510 via the computer/controller 524. The user can also use the computer 536 to deploy and retract a retractable landmark in the workspace.

The method 600 can include positioning one or more retractable landmarks in a work area, as in operation 604.

The method 600 can include determining, using a computer, when landmarks in the work area for the mobile robot to use as perimeter markers to provide a perimeter for the mobile robot to autonomously operate, do not meet the operational threshold, as in operation 608.

The method can include in operation 612, determining if an operational threshold is met. If the operational threshold is met, the method returns to operation 608. If the operational threshold is not met, the method proceeds to operation 616.

The method 600 can include deploying, using the computer, a retractable landmark in a work area in response to an operational threshold not being met for a mobile robot to autonomously operate traversing the work area, as in operation 616.

The method 600 can include retracting, using the computer, the retractable landmark, as in operation 620. For example, an operator or user can initiate retraction of the landmark when a robot operation in completed. In one example, the retractable landmark can be retracted into a recess such that a work area floor is unobstructed when the landmark is retracted. When the retractable landmark is deployed, the landmark obstructs the floor but also provides a landmark for the mobile robot which detects the retractable landmark using one or more sensors mounted on the robot.

In one example, the deployment of the retractable landmark can provide another perimeter marker in addition to the landmarks in the work area used as the perimeter markers. The operational threshold is met when the retractable landmark is deployed.

In another example, the determining when the landmarks do not provide the perimeter meeting the operational threshold can include using a computer simulation.

In one embodiment, the method can further include retracting the retractable landmark to remove the retractable landmark to use as a perimeter marker.

In another example, the retractable landmark can be actuatable from a hidden position to a deployed position resulting in the operational threshold being met. The hidden position results in the operational threshold not being met.

In another example, the retractable landmark is actuatable from a hidden position to a deployed position as a perimeter marker. When the retractable landmark is in the hidden position, the retractable landmark is not available as a perimeter marker.

In another example, the retractable landmark is actuatable from a hidden position to a deployed position as a perimeter marker. When the retractable landmark is in the hidden position, the retractable landmark is not available as a perimeter marker, and actuating the retractable landmark from the hidden position includes mechanical operation.

In another example, the retractable landmark is actuatable from a hidden position to a deployed position as a perimeter marker. When in the hidden position, the retractable landmark is not available as a perimeter marker, and actuating the retractable landmark from the hidden position includes mechanical operation which includes electrical or mechanical actuation in the deploying of the retractable landmark.

In another example, the retractable landmark is actuatable from a hidden position to a deployed position as a perimeter marker. When in the hidden position, the retractable landmark is not available as a perimeter marker. And actuating the retractable landmark from the hidden position and retracting the retractable landmark from the deployed position includes mechanical operation which includes electrical or mechanical actuation and retraction in the deploying and retraction of the retractable landmark.

In one embodiment, the method can further include actuating, as part of the deploying, the retractable landmark from a hidden position to a deployed position as a perimeter marker. The retractable landmark in the hidden position is not available as a perimeter marker. The actuating of the retractable landmark from the hidden position includes mechanical operation. The method includes retracting the retractable landmark from the deployed position to return to the hidden position, and the retracting includes mechanical operation.

In one embodiment, the method can further include actuating, as part of the deploying, the retractable landmark from a hidden position to a deployed position as a perimeter marker. The retractable landmark in the hidden position is not available as a perimeter marker, and the actuating of the retractable landmark from the hidden position includes mechanical operation which includes electrical or mechanical actuation in the deploying of the retractable landmark. The method includes retracting the retractable landmark from the deployed position to return to the hidden position, and the retracting includes mechanical operation which includes electrical or mechanical actuation in the retracting of the retractable landmark.

In one embodiment, the method can further include deploying a plurality of retractable landmarks in the work area in response to the operational threshold not being met for the mobile robot to autonomously operate traversing the work area.

In one embodiment, the method can further include determining which objects of a plurality of objects in the work areas to designate as the landmarks in the work area for the mobile robot to use as the perimeter markers to provide the perimeter for the mobile robot to operate traversing the work area.

In one embodiment, the method can further include scanning, using a device communicating with the computer, the work area for the landmarks, as part of the determining when the landmarks in the work area for the mobile robot to use as the perimeter markers provides the perimeter for the mobile robot.

In one embodiment, the method can further include receiving, at the computer, a layout of the work area for the mobile robot, as part of the determining when the landmarks in the work area do not provide the perimeter meeting the operational threshold.

In one example, the operational threshold includes requirements for the perimeter markers meeting specifications for guidance of the mobile robot.

In one example, the operational threshold includes requirements for perimeter markers to meet specifications for guidance used by a guidance system of the mobile robot. The specifications of the perimeter markers meet requirements for physical attributes for being detectable by the guidance system.

In one embodiment, a system for facility navigation localization for a mobile robot operating autonomously includes a scanning device, capable of communication with a computer, to detect landmarks in a work area for operation of a mobile robot. The computer has computer readable storage medium with embodied program instructions to determine when landmarks in the work area do not provide perimeter markers to define a perimeter meeting an operational threshold for the mobile robot to autonomously operate traversing the work area. One or more retractable landmarks are deployable in the work area, using the computer, in response to the operational threshold not being met.

In another embodiment, a method for facility navigation localization for a mobile robot operating autonomously includes determining, using a computer, when landmarks in a work area do not provide perimeter markers to define a perimeter meeting an operational threshold for a mobile robot to autonomously operate traversing the work area. The method includes initiating, using the computer, deployment of a retractable landmark in the work area in response to the operational threshold not being met.

In another embodiment, the method can further include generating a layout plan including the retractable landmark, for facility navigation localization for the mobile robot.

In one embodiment, a system for facilitating navigation localization for a mobile robot operating autonomously can comprise a computer system. The computer system can comprise: a computer processor, a computer-readable storage medium, and program instructions stored on the computer-readable storage medium being executable by the processor, to cause the computer system to perform the following functions to: deploy, using a computer, a retractable landmark in a work area in response to an operational threshold not being met for a mobile robot to autonomously operate traversing the work area. The operational threshold not being met being based on a determination, using the computer, when landmarks in the work area for the mobile robot to use as perimeter markers to provide a perimeter for the mobile robot to autonomously operate, do not meet the operational threshold.

In another embodiment, a computer program product for facilitating navigation localization for a mobile robot operating autonomously. The computer program product can comprise a computer readable storage medium having program instructions embodied therewith. The program instructions are executable by a computer to cause the computer to perform functions, by the computer, comprising the functions to: deploy, using a computer, a retractable landmark in a work area in response to an operational threshold not being met for a mobile robot to autonomously operate traversing the work area. The operational threshold not being met being based on a determination, using the computer, when landmarks in the work area for the mobile robot to use as perimeter markers to provide a perimeter for the mobile robot to autonomously operate, do not meet the operational threshold.

In one embodiment, a system for facilitating navigation localization for a mobile robot operating autonomously can comprise a computer system. The computer system can comprise: a computer processor, a computer-readable storage medium, and program instructions stored on the computer-readable storage medium being executable by the processor, to cause the computer system to perform the following functions to: determine when landmarks in a work area do not provide perimeter markers to define a perimeter meeting an operational threshold for a mobile robot to autonomously operate traversing the work area; and initiate deployment of a retractable landmark in the work area in response to the operational threshold not being met.

In another embodiment, a computer program product for facilitating navigation localization for a mobile robot operating autonomously. The computer program product can comprise a computer readable storage medium having program instructions embodied therewith. The program instructions are executable by a computer to cause the computer to perform functions, by the computer, comprising the functions to: determine when landmarks in a work area do not provide perimeter markers to define a perimeter meeting an operational threshold for a mobile robot to autonomously operate traversing the work area; and initiate deployment of a retractable landmark in the work area in response to the operational threshold not being met.

In one embodiment, a system for facilitating navigation localization for a mobile robot operating autonomously can include generating, using a computer, a computational model to determine when landmarks in a work area do not provide perimeter markers to define a perimeter meeting an operational threshold for a mobile robot to autonomously operate traversing the work area. The system can include, based on the computational model, initiating deployment of a retractable landmark in the work area in response to the operational threshold not being met.

Additional Embodiments and Examples

In another embodiment, a system to facilitate localization for an autonomous mobile robot can include deploying retractable landmarks in a locale where an autonomous mobile robot is operatable. The retractable landmarks providing landmarks for the autonomous mobile robot operating in the locale. The deployment of the retractable landmarks is in response to scanning the locale for the landmarks and determining availability of the landmarks below a threshold.

A computer implemented method as disclosed herein can include modeling, for example, digital modeling and/or computational modeling, using the computer. The model can be generated using a learning engine or modeling module of a computer system which can be all or in part of an Artificial Intelligence (AI) system which communicates with the computer and/or a control system. Such a computer system can include or communicate with a knowledge corpus or historical database. In one example, an acceptable model can include a model meeting specified parameters. In another example, an acceptable model can be a model which has undergone several iterations of modeling. When the model is not acceptable, the method can return to a previous operation or proceed as directed, for example as represented by a operational block in a flowchart.

In one example according to the present disclosure, a method can generate a model, using a computer, which can include a series of operations. The model can be generated using a learning engine or modeling module of a computer system which can be all or in part of an Artificial Intelligence (AI) system which communicates with a computer and/or a control system. Such a computer system can include or communicate with a knowledge corpus or historical database.

The model can be generated using a learning engine or modeling module of a computer system which can be all or in part of an Artificial Intelligence (AI) system which communicates with a computer and/or a control system. Such a computer system can include or communicate with a knowledge corpus or historical database. A model can also be generated by an AI system such as an output at least in part of an AI system analysis using machine learning.

Other Examples and Embodiments

In another example, the computer 536 can be part of a device. The computer 536 can include a processor and a computer readable storage medium where an application can be stored which can in one example, embody all or part of the method of the present disclosure. The application can include all or part of instructions to implement the method of the present disclosure, embodied in code and stored on a computer readable storage medium. A device can include a display. The device can operate, in all or in part, in conjunction with a remote server by way of a communications network 560, for example, the Internet.

In other embodiments and examples, in the present disclosure shown in the figures, a computer can be part of a remote computer or a remote server, for example, a remote server. In another example, the computer can be part of a control system and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs. A device(s), for example a mobile device or mobile phone, can belong to one or more users, and can be in communication with the control system via the communications network.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device can include a computer having a processor and a storage medium which stores an application, and the computer includes a display. The application can incorporate program instructions for executing the features of the present disclosure using the processor. In another example, the mobile device application or computer software can have program instructions executable for a front end of a software application incorporating the features of the method of the present disclosure in program instructions, while a back end program or programs, of the software application, stored on the computer of the control system communicates with the mobile device computer and executes other features of the method. The control system and the device (e.g., mobile device or computer) can communicate using a communications network, for example, the Internet.

Methods and systems according to embodiments of the present disclosure, can be incorporated in one or more computer programs or an application stored on an electronic storage medium, and executable by the processor, as part of the computer on mobile device. For example, a mobile device can communicate with the control system, and in another example, a device such as a video feed device can communicate directly with the control system. Other users (not shown) may have similar mobile devices which communicate with the control system similarly. The application can be stored, all or in part, on a computer or a computer in a mobile device and at a control system communicating with the mobile device, for example, using the communications network, such as the Internet. It is envisioned that the application can access all or part of program instructions to implement the method of the present disclosure. The program or application can communicate with a remote computer system via a communications network (e.g., the Internet) and access data, and cooperate with program(s) stored on the remote computer system. Such interactions and mechanisms are described in further detail herein and referred to regarding components of a computer system, such as computer readable storage media, which are shown in one or more embodiments herein and described in more detail in regards thereto referring to one or more computers and systems described herein.

Also, referring to the figures, a device can include a computer, computer readable storage medium, and operating systems, and/or programs, and/or a software application, which can include program instructions executable using a processor. Embodiments of these features are shown herein in the figures. The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Referring to one or more embodiments in the figures, a computer or a device, also can be referred to as a user device or an administrator's device, includes a computer having a processor and a storage medium where an application can be stored. The application can embody the features of the method of the present disclosure as instructions. The user can connect to a learning engine using the device. The device which includes the computer and a display or monitor. The application can embody the method of the present disclosure and can be stored on the computer readable storage medium. The device can further include the processor for executing the application/software. The device can communicate with a communications network, e.g., the Internet.

It is understood that the user device is representative of similar devices which can be for other users, as representative of such devices, which can include, mobile devices, smart devices, laptop computers etc.

Additional Examples and Embodiments

In one example, a system according to the present disclosure can include a control system communicating with a user device via a communications network. The control system can incorporate all or part of an application or software for implementing the method of the present disclosure. The control system can include a computer readable storage medium where account data and/or registration data can be stored. User profiles can be part of the account data and stored on the storage medium. The control system can include a computer having computer readable storage medium and software programs stored therein. A processor can be used to execute or implement the instructions of the software program. The control system can also include a database.

A control system can include a storage medium for maintaining a registration of users and their devices for analysis of the audio input. Such registration can include user profiles, which can include user data supplied by the users in reference to registering and setting-up an account. In an embodiment, the method and system which incorporates the present disclosure includes the control system (generally referred to as the back-end) in combination and cooperation with a front end of the method and system, which can be the application. In one example, the application is stored on a device, for example, a computer or device on location, and can access data and additional programs at a back end of the application, e.g., control system.

Referring to the figures, and for example, FIG. 4, a system 500 includes a computer 536 which can be integral to or communicating with a device and communicate with other computers such as computer 524 of the robot 510. A computer 590 remote from the robot 510 can electronically communicate, in all or in part, with a control system computer 572 as part of a control system 570. The control system 570 can include the computer 572 having a computer readable storage medium 573 which can store one or more programs 574, and a processor 575 for executing program instructions. The control system 570 can include control software 578 for managing the one or more programs. The control system can also include a storage medium which can include registration and/or account data 582 and user profiles 583 of users or entities (such entities can include robotic entities) as part of user accounts 581. User accounts 581 can be stored on a storage medium 580 which is part of the control system 570. The user accounts 581 can include registrations and account data 582 and user profiles 583. The control system can also include the computer 572 having a computer readable storage medium 573 which can store programs or code embedded on the storage medium. The program code can be executed by a processor 575. The computer 572 can communicate with a database 576. The control system 570 can also include a database 576 for storing all or part of such data as described above, and other data.

The control system can also communicate with a computer system 590 which can include a learning engine/module 592 and a knowledge corpus or database 596. The computer system 590 can also communicate with the computer 536. In another example, the computer system 590 can be all or part of the control system, or all or part of a device. The depiction of the computer system 590 as well as the other components of the system 500 are shown as one example according to the present disclosure. One or more computer systems can communicate with a communications network 560, e.g., the Internet. For example, the computer 590, and the control system 570 can communicate with the communications network 560, and the device/computer 536 can communicate with a local communications network which can communicate with the communications network 560.

In one example, functions of the control system can be run as a service 561, providing the function of the control system to the computer 536 at the location 502.

Thus, in one example, a control system can be in communication with a computer or device, and the computer can include an application or software. The computer, or a computer in a mobile device can communicate with the control system using the communications network. In another example, the control system can have a front-end computer belonging to one or more users, and a back-end computer embodied as the control system.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, which may be shown, for example, in the example figures, for instance an application stored on a computer readable storage medium of a computer or device. The application is stored on the device or computer and can access data and additional programs at the back end of the application, for example, in the program(s) stored in the control system.

The program(s) can include all or in part, a series of executable steps for implementing the method of the present disclosure. A program, incorporating the present method, can be all or in part stored in the computer readable storage medium on the control system or, in all or in part, on a computer or device. It is envisioned that the control system can not only store the profile of users, but in one embodiment, can interact with a website for viewing on a display of a device such as a mobile device, or in another example the Internet, and receive user input related to the method and system of the present disclosure. It is understood that embodiments shown in the figures depicts one or more profiles, however, the method can include multiple profiles, users, registrations, etc. It is envisioned that a plurality of users or a group of users can register and provide profiles using the control system for use according to the method and system of the present disclosure.

In one example, received data can include data in a knowledge corpus and historical database, which can be populated by historical data gathered, for example, from sensors, robotic device, or other machines or devices.

In another example and embodiment, profiles can be saved for entities such as users, participants, operators, human operators, or robotic devices. Such profiles can supply data regarding the user and history of deliveries for analysis. In one example, a user can register or create an account using the control system which can include one or more profiles as part of registration and/or account data. The registration can include profiles for each user having personalized data. For example, users can register using a website via their computer and GUI (Graphical User Interface) interface. The registration or account data can include profiles for an account for each user. Such accounts can be stored on the control system, which can also use the database for data storage. A user and a related account can refer to, for example, a person, an administrator, or an operator, or an entity, or a corporate entity, or a corporate department, or another machine such as an entity for automation such as a system using, in all or in part, artificial intelligence.

Still Further Embodiments and Examples

Account data, for instance, including profile data related to a user, and any data, personal or otherwise, can be collected and stored, for example, in a control system. It is understood that such data collection is done with the knowledge and consent of a user, and stored to preserve privacy, which is discussed in more detail below. Such data can include personal data, and data regarding personal items.

In one example a user can register and have an account with a user profile on a control system. For example, data can be collected using techniques as discussed above, for example, using cameras, and data can be uploaded to a user profile by the user. A user can include, for example, a corporate entity, or department of a business, or a homeowner, or any end user, a human operator, or a robotic device, or other personnel of a business.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model as discussed herein in embodiments of the present disclosure. An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources. In another example, a control system can be all or part of an Artificial Intelligence (AI) system. For example, the control system can be one or more components of an AI system.

In one example, a new or different AI (Artificial Intelligence) ecosystem, or technology/communication or IT (Information Technology) ecosystem can include a local communications network which can communicate with the communications network 160. The system 100 can include a learning engine/module 192, which can be at least part of the control system or communicating with the control system, for generating a model 593 or learning model. In one example, the learning model can model workflow in a new AI or IoT (Internet of Things) ecosystem for machine/devices in the new ecosystem.

It is also understood that methods and systems according to embodiments of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

More Examples and Embodiments

Additionally, methods and systems according to embodiments of the present disclosure can be discussed in relation to a functional system(s) depicted by functional block diagrams. The methods and systems can include components and operations for embodiments according to the present disclosure and is used herein for reference when describing the operational steps of the methods and systems of the present disclosure. Additionally, the functional system, according to an embodiment of the present disclosure, depicts functional operations indicative of the embodiments discussed herein.

The methods and systems of the present disclosure can include a series of operational blocks for implementing one or more embodiments according to the present disclosure. A method shown in the figures may be another example embodiment, which can include aspects/operations shown in another figure and discussed previously but can be reintroduced in another example. Thus, operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

It is understood that the features shown in some of the figures, for example block diagrams, are functional representations of features of the present disclosure. Such features are shown in embodiments of the systems and methods of the present disclosure for illustrative purposes to clarify the functionality of features of the present disclosure.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or ecosystems or environments, which can include, for example and artificial intelligence (AI) environment.

The descriptions of the various embodiments of the present invention have been presented for purposes of illustration but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is also understood that the one or more computers or computer systems shown in the figures can include all or part of a computing environment and its components shown in another figure, for example, the computing environment 1000 can be incorporated, in all or in part, in one or more computers or devices shown in other figures and described herein. In one example, the one or more computers can communicate with all or part of a computing environment and its components as a remote computer system to achieve computer functions described in the present disclosure.

More Additional Examples and Embodiments

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves opropagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
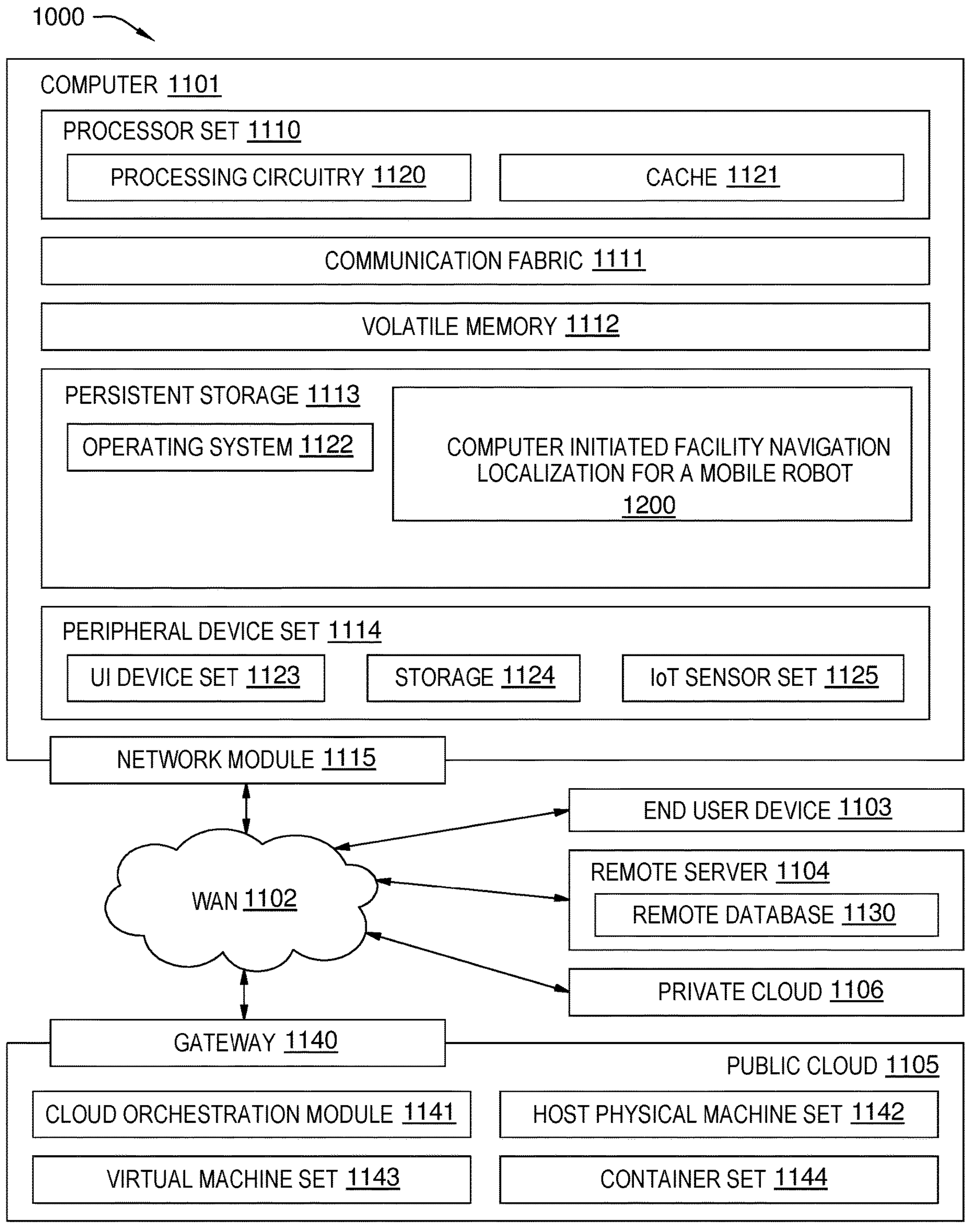
FIG. 6 is a schematic block diagram depicting a computer system according to an embodiment of the disclosure, which includes cloud computing components and functions, and which can cooperate with the systems and methods shown in the figures and described herein.

Referring to FIG. 6, a computing environment 1000 contains an example of an environment for the execution of at least some of the computer code involved in performing the inventive methods, such as a computer initiated facility navigation localization for a mobile robot 1200. In addition to block 1200, computing environment 1000 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 7. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

What is claimed is:

1. A method for facility navigation localization for a mobile robot operating autonomously, comprising:

deploying, using a computer, a retractable landmark in a work area in response to an operational threshold not being met for a mobile robot to autonomously operate traversing the work area;

the operational threshold not being met being based on, determining, using the computer, when landmarks in the work area for the mobile robot to use as perimeter markers to provide a perimeter for the mobile robot to autonomously operate, do not meet the operational threshold;

wherein the deploying of the retractable landmark obstructs a floor of the work area, and provides a landmark for the mobile robot which detects the retractable landmark using one or more sensors mounted on the robot; and retracting the retractable landmark into a recess such that the floor of the work area is unobstructed when the landmark is retracted.

2. The method of claim 1, wherein the deployment of the retractable landmark provides another perimeter marker in addition to the landmarks in the work area used as the perimeter markers, and the operational threshold is met when the retractable landmark is deployed.

3. The method of claim 1, wherein the determining when the landmarks do not provide the perimeter meeting the operational threshold includes using a computer simulation.

4. The method of claim 1, further comprising:

retracting the retractable landmark to remove the retractable landmark to use as a perimeter marker.

5. The method of claim 1, wherein the retractable landmark is actuatable from a hidden position to a deployed position resulting in the operational threshold being met, and the hidden position results in the operational threshold not being met.

6. The method of claim 1, wherein the retractable landmark is actuatable from a hidden position to a deployed position as a perimeter marker, and when in the hidden position the retractable landmark is not available as a perimeter marker.

7. The method of claim 1, wherein the retractable landmark is actuatable from a hidden position to a deployed position as a perimeter marker, and when in the hidden position the retractable landmark is not available as a perimeter marker, and actuating the retractable landmark from the hidden position includes mechanical operation.

8. The method of claim 1, wherein the retractable landmark is actuatable from a hidden position to a deployed position as a perimeter marker, and when in the hidden position the retractable landmark is not available as a perimeter marker, and actuating the retractable landmark from the hidden position includes mechanical operation which includes electrical or mechanical actuation in the deploying of the retractable landmark.

9. The method of claim 1, wherein the retractable landmark is actuatable from a hidden position to a deployed position as a perimeter marker, and when in the hidden position the retractable landmark is not available as a perimeter marker, wherein actuating the retractable landmark from the hidden position and retracting the retractable landmark from the deployed position includes mechanical operation which includes electrical or mechanical actuation and retraction in the deploying and retraction of the retractable landmark.

10. The method of claim 1, further comprising:

actuating, as part of the deploying, the retractable landmark from a hidden position to a deployed position as a perimeter marker, wherein the retractable landmark in the hidden position is not available as a perimeter marker, and wherein the actuating of the retractable landmark from the hidden position includes mechanical operation; and retracting the retractable landmark from the deployed position to return to the hidden position, wherein the retracting includes mechanical operation.

11. The method of claim 1, further comprising:

actuating, as part of the deploying, the retractable landmark from a hidden position to a deployed position as a perimeter marker, wherein the retractable landmark in the hidden position is not available as a perimeter marker, and wherein the actuating of the retractable landmark from the hidden position includes mechanical operation which includes electrical or mechanical actuation in the deploying of the retractable landmark;

retracting the retractable landmark from the deployed position to return to the hidden position, wherein the retracting includes mechanical operation which includes electrical or mechanical actuation in the retracting of the retractable landmark.

12. The method of claim 1, further comprising:

deploying a plurality of retractable landmarks in the work area in response to the operational threshold not being met for the mobile robot to autonomously operate traversing the work area.

13. The method of claim 1, further comprising:

determining which objects of a plurality of objects in the work areas to designate as the landmarks in the work area for the mobile robot to use as the perimeter markers to provide the perimeter for the mobile robot to operate traversing the work area.

14. The method of claim 1, further comprising:

scanning, using a device communicating with the computer, the work area for the landmarks, as part of the determining when the landmarks in the work area for the mobile robot to use as the perimeter markers provides the perimeter for the mobile robot.

15. The method of claim 1, further comprising:

receiving, at the computer, a layout of the work area for the mobile robot, as part of the determining when the landmarks in the work area do not provide the perimeter meeting the operational threshold.

16. The method of claim 1, wherein the operational threshold includes requirements for the perimeter markers meeting specifications for guidance of the mobile robot.

17. The method of claim 1, wherein the operational threshold includes requirements for perimeter markers to meet specifications for guidance used by a guidance system of the mobile robot, and the specifications of the perimeter markers meet requirements for physical attributes for being detectable by the guidance system.

18. A system for facility navigation localization for a mobile robot operating autonomously, which comprises:

a scanning device, capable of communication with a computer, to detect landmarks in a work area for operation of a mobile robot, and the computer having computer readable storage medium with embodied program instructions to determine when landmarks in the work area do not provide perimeter markers to define a perimeter meeting an operational threshold for the mobile robot to autonomously operate traversing the work area;

one or more retractable landmarks being deployable in the work area, using the computer, in response to the operational threshold not being met;

wherein the deploying of the retractable landmark obstructs a floor of the work area, and provides a landmark for the mobile robot which detects the retractable landmark using one or more sensors mounted on the robot; and retracting the retractable landmark into a recess such that the floor of the work area is unobstructed when the landmark is retracted.

19. A method for facility navigation localization for a mobile robot operating autonomously, comprising:

determining, using a computer, when landmarks in a work area do not provide perimeter markers to define a perimeter meeting an operational threshold for a mobile robot to autonomously operate traversing the work area;

initiating, using the computer, deployment of a retractable landmark in the work area in response to the operational threshold not being met;

wherein the deploying of the retractable landmark obstructs a floor of the work area, and provides a landmark for the mobile robot which detects the retractable landmark using one or more sensors mounted on the robot; and retracting the retractable landmark into a recess such that the floor of the work area is unobstructed when the landmark is retracted.

20. The method of claim 19, further comprising:

generating a layout plan including the retractable landmark, for facility navigation localization for the mobile robot.

* * * * *